United States Patent [19]

Getson

[11] 4,166,078

[45] Aug. 28, 1979

[54] MODIFIED ORGANOPOLYSILOXANE COMPOSITIONS

[75] Inventor: John C. Getson, Adrian, Mich.

[73] Assignee: SWS Silicones Corporation, Adrian, Mich.

[21] Appl. No.: 861,312

[22] Filed: Dec. 16, 1977

[51] Int. Cl.$^2$ ............................................. C08L 43/04
[52] U.S. Cl. .............................. 528/26; 260/448.2 H; 204/159.13; 204/159.15; 528/25; 528/31; 528/32; 528/33; 528/34; 525/477; 525/478; 525/479
[58] Field of Search ................... 260/46.5 H, 46.5 UA, 260/827, 448.2 H; 204/159.13, 159.15; 528/31–34, 25

[56] References Cited

U.S. PATENT DOCUMENTS

| | | | |
|---|---|---|---|
| 3,271,362 | 9/1966 | Chalk et al. ................. | 260/46.5 UA |
| 3,433,760 | 3/1969 | Clark et al. .................... | 260/827 |
| 3,555,109 | 1/1971 | Getson ............................... | 260/827 |
| 3,627,836 | 12/1971 | Getson ............................... | 260/827 |
| 3,631,087 | 12/1971 | Lewis et al. ....................... | 260/827 |
| 3,694,478 | 9/1972 | Adams et al. ..................... | 260/827 |
| 3,776,875 | 12/1973 | Getson ............................... | 260/827 |
| 3,950,300 | 4/1976 | Hittmair et al. .................. | 260/827 |
| 4,016,333 | 4/1977 | Gaske et al. ..................... | 204/159.13 |

Primary Examiner—Melvyn I. Marquis

[57] ABSTRACT

A modified organopolysiloxane composition containing in situ generated particulate matter and a method for preparing the same which comprises reacting an organohydrogenpolysiloxane with an organic monomer in the presence of a free radical initiator at an elevated temperature. The resultant composition may be combined with vinyl containing compounds having at least two vinyl groups per molecule and a catalyst which promotes addition of SiH groups to vinyl groups to form elastomers.

20 Claims, No Drawings

MODIFIED ORGANOPOLYSILOXANE COMPOSITIONS

This invention relates to modified organopolysiloxanes, particularly to organopolysiloxane compositions containing in situ generated particulate matter. More particularly this invention relates to cured organopolysiloxanes having improved physical properties and to a method for preparing same.

BACKGROUND OF THE INVENTION

Modified organopolysiloxanes have been prepared heretofore by reacting monomers containing aliphatic unsaturation with organopolysiloxanes containing terminal hydroxyl or hydrolyzable groups in the presence of free radicals as shown in U.S. Pat. Nos. 3,555,109 and 3,776,875 to Getson. Also U.S. Pat. No. 3,631,087 to Lewis describes a process for preparing modified organopolysiloxanes by gradually adding a mixture of monomers and free radical initiators to preheated organopolysiloxanes. U.S. Pat. No. 3,694,478 to Adams et al discloses a process for preparing modified organopolysiloxanes by the gradual addition of free radical initiators to a preheated mixture containing an organopolysiloxane and an organic monomer having aliphatic unsaturation. U.S. Pat. No. 4,032,499 to Kreuzer et al describes a process for preparing modified organopolysiloxanes by reacting monomers containing aliphatic unsaturation with organopolysiloxanes containing hydrolyzable or hydroxyl groups in the presence of free radical initiators and an inert liquid having a boiling point up to about 100° C. at 760 mm Hg (abs.), in which the inert liquid is a nonsolvent for the organopolysiloxanes and the resultant reaction product at the polymerization temperature. Polyolefin filled vinylorganopolysiloxane compositions which are prepared by polymerizing monomers having aliphatic unsaturation in the presence of vinylorganopolysiloxanes and free radical initiators are described in U.S. Pat. No. 4,014,851 to Bluestein.

Although organopolysiloxane elastomers have been used in various industrial applications because of their thermal stability, dielectric properties and resistance to atmospheric deterioration, it has been found that in certain applications there organopolysiloxane elastomers do not have the desired properties. Attempts to improve the physical properties by adding reinforcing fillers or agents, such as polytetrafluoroethylene fibers, have not improved the physical properties to the desired degree. For example, when polytetrafluoroethylene fibers have been dispersed in a random manner in an organopolysiloxane, it was found that it was difficult to form a homogeneous mixture. Also, it has been found that the modified organopolysiloxanes prepared heretofore have a tendency to shrink during curing. This property is especially undesirable when the composition is used as a molding or potting composition.

Therefore, it is an object of this invention to provide organopolysiloxane compositions containing in situ generated particulate matter. Another object of this invention is to provide a method for preparing modified organopolysiloxanes containing in situ generated particulate matter. Still another object of this invention is to prepare modified organopolysiloxanes by reacting SiH containing organopolysiloxanes with monomers containing aliphatic unsaturation in the presence of free radical initiators. A further object of this invention is to provide curable organopolysiloxanes containing in situ generated particulate matter. A still further object of this invention is to provide elastomeric compositions having improved physical properties.

SUMMARY OF THE INVENTION

The foregoing objects and others which will become apparent from the following description are accomplished by polymerizing organic monomers or low molecular weight polymers having aliphatic unsaturation with SiH containing organopolysiloxanes in the presence of free radical initiators at an elevated temperature to form a composition containing in-situ generated particulate matter. The resultant composition can be combined with a vinyl containing compound having at least two vinyl groups per molecule and a catalyst which promotes the addition of SiH groups to vinyl groups to form elastomers.

DETAILED DESCRIPTION OF THE INVENTION

Organopolysiloxanes having at least two SiH groups per molecule which may be used in the practice of this invention may be represented by the average unit formula $$(R)_a Si(H)_b SiO_{4-a-b/2} \qquad \text{I}$$

where R is an organic radical free of aliphatic unsaturation and is selected from monovalent hydrocarbon radicals, halogenated monovalent hydrocarbon radicals, and cyanoalkyl radicals, a has a value of from 0 to 2.5 and preferably from 0.5 to 2.1 and b has a value of from 0.0005 to 2.0 and the sum of a and b is equal to form 1.0 to 3.

Examples of suitable monovalent hydrocarbon radicals are alkyl radicals having from 1 to 18 carbon atoms, such as methyl, ethyl, propyl, butyl, hexyl, octyl, decyl and octadecyl radicals; cycloalkyl radicals such as the cyclopentyl and cyclohexyl radicals; aryl radicals such as the phenyl and naphthyl radicals; alkaryl radicals such as the benzyl radical, the alpha, beta phenyl-ethyl radicals and the alpha, beta phenyl-propyl radicals; halogenated derivatives of the aforesaid radicals including chloromethyl, trifluoromethyl, chloropropyl, chlorophenyl, dibromophenyl, tetrachlorophenyl and difluorophenyl radicals; and cyanoalkyl radicals such as beta cyanoethyl, gamma-cyanopropyl and beta-cyanopropyl. It is preferred that the R groups in Formula I have from 1 to 3 carbon atoms and more preferably that R be a methyl radical. Formula I is intended to include those materials wherein the R groups are mixtures of the aforesaid radicals. For purposes of this invention, the SiH containing organopolysiloxanes represented by Formula I above have a viscosity in the range of from 10 to 10,000,000 centipoise at 25° C., and more preferably from 50 to 5,000,000 centipoise at 25° C.

It is understood, that Formula I is intended to include organohydrogenpolysiloxanes which have terminal SiH groups or contain SiH groups along the chain or which are SiH terminated and also contain SiH groups along the chain. It is preferred that the organohydrogenpolysiloxanes contain at least two silicon bonded hydrogen groups per molecule, especially if the resultant composition is to be converted to an elastomer.

The organohydrogenpolysiloxanes may also be copolymers which contain at least one unit per molecule of the formula:

$$(R)_c(H)_d SiO_{4-c-d/2} \qquad \text{II}$$

where R is the same as above, c has a value of 0, 1 or 2, d has a value of 1 or 2 and the sum of c and d is equal to 1, 2 or 3 and the remaining siloxane units in the organopolysiloxane being units of the formula $$(R)_n SiO_{4-n/2} \qquad \text{III}$$

where R is the same as above and n has a value of 0, 1, 2 or 3. Thus where the organohydrogenpolysiloxane is a copolymer having siloxane units within the scope of Formula II and siloxane units within Formula III, the copolymer generally contains from 0.1 to 99.5 mol percent of units within the scope of Formula II and from 0.5 to 99.9 mol percent of units within the scope of Formula III.

Siloxane units within the scope of Formula II are hydrogen siloxane units ($H SiO_{1.5}$), methyl hydrogen siloxane units ($H Si Ch_3 O$), dimethyl hydrogen siloxane units and dihydrogen siloxane units ($H_2 SiO$).

A preferred class of organohydrogenpolysiloxanes within the scope of Formula I above are those referred to as SiH terminated diorganopolysiloxanes, such as for example those having the general formula

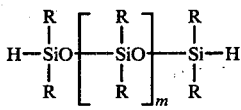

where R is the same as above and m has a value sufficient to provide a viscosity of from 10 to 1,000,000 centipoise at 25° C. It is preferred that the R groups be methyl groups. Suitable organohydrogenpolysiloxanes are disclosed in U.S. Pat. Nos. 2,823,218, 3,159,662 and 3,220,972.

Specific examples of organohydrogenpolysiloxanes within the scope of Formula I above are 1,3-dimethyldisiloxane, 1,1,3,3-tetramethyldisiloxane as well as higher polymers containing up to 100,000 silicon atoms per molecule.

Any polymerizable organic monomer having aliphtic unsaturation may be polymerized with the organohydrogenpolysiloxanes. Examples of suitable organic monomers are low molecular weight straight-chain hydrocarbons such as ethylene, propylene, butylene; vinyl halides such as vinyl chloride and vinyl fluoride; vinyl esters of organic acids such as vinyl acetate; styrene, ring-substituted styrenes and other vinyl aromatics such as vinylpyridine and vinylnaphthalene; acrylic acid and derivatives of acrylic acid including the salts, esters, amides and acrylonitrile; N-vinyl compounds such as N-vinylcarbazole, N-vinylpyrrolidone and N-vinylcaprolactam; and vinyl silicon compounds such as vinyltriethoxysilane.

Disubstituted ethylenes of the type $CH_2=CX_2$ may be used including vinylidene fluoride, vinylidene chloride, vinylidene cyanide, methacrylic acid and compounds derived therefrom such as the salts, esters and amides as well as methacrolein, methacrylonitrile and the like.

Examples of disubstituted ethylenes of the type $CHX=CHX$ such as vinylene carbonate and various monomers which polymerize best in the presence of other monomers, e.g. maleic anhydride, esters of maleic and fumaric acids, stilbene, indene and coumarone may be used in the formation of the polymeric compositions of this invention.

Other monomers which may be employed in the polymerization are polyfunctional olefinic monomers, i.e., having at least two olefinic linkages, are esters such as allyl methacrylate, allyl acrylate, diallyl adipate, methallyl acrylate, methallyl methacrylate, vinyl acrylate, vinyl methacrylate, hydrocarbons such as divinylbenzene and vinyl cyclohexane; polyol esters of acrylic and methacrylic acid, e.g., ethylene dimethacrylate, tetramethylene diacrylate and pentaerythritol tetramethacrylate and conjugated diolefins such as 1,3-butadiene, isoprene and chloroprene.

These monomers may be used singly or in combinations of two or three or even more. The properties of the reaction product, of course, depend on the nature and identify of the monomeric material as well as on the amounts used relative to the organohydrogenpolysiloxanes. Monomers that give elastomeric homopolymers generally provide elastomeric reaction products while those that give plastic homopolymers tend to yield products which are less elastic.

The reaction is most expeditiously effected by using a free-radical initiator, normally organic peroxides, although other free-radical initiators such as azo-compounds in which both the N atoms of the azo linkage are attached to a tertiary carbon atom and the remaining valences of the tertiary carbon atom are satisfied by nitrile, carboxylalkyl, cycloalkylene or alkyl radicals, preferably having from 1 to 18 carbon atoms. In addition to the above mentioned initiators, ionizing radiation may also be used to bring about the formation of free radicals.

The most suitable peroxide initiators are compounds of the formula ROOH or compounds of the formula ROOR in which R is an organic radical. Specific examples of peroxides which are operative in this invention are hydroperoxides such as t-butyl hydroperoxide, cumene hydroperoxide, decaline hydroperoxide; dialkyl peroxides such as di-t-butyl and dicumyl peroxide; cyclic peroxides such as ascaridole and 1,5-dimethylhexane-1,5-peroxide and peresters such as t-butyl perbenzoate, t-butyl peroxyisopropylcarbonate and t-butyl peroctoate; ketone peroxides such as acetone peroxide and cyclohexanone peroxide are also applicable.

Acyl peroxides and peracids may be used in the practice of this invention, but in general they result in less grafting, i.e., poor yields of the grafted product. The difference is believed to lie in the nature of the radicals produced. Thus tertiary alkoxy radicals from di-t-butyl peroxide, for example have a tendency to abstract hydrogen atoms from the organic groups linked to the silicon atoms, which is a possible mechanism in grafting. On the other hand, acyloxy radicals produced from an acyl peroxide e.g., benzoyl peroxide, while effective polymerization initiators are relatively ineffective in abstracting hydrogen atoms from the organic groups linked to the silicon atoms.

The amount of free-radical initiator employed is not critical and as little as 0.05 percent of the more active peroxide initiators based on the weight of the monomer is generally adequate in most cases. However, where it is desirable to increase the reaction rate, then as much as 3 percent or even more of the initiator may be used. As a general rule, it is advisable not to exceed about 5 percent concentration, since higher concentrations tend to promote cross-linking and thus cause an undesirable increase in the viscosity of the reaction mixture.

These free radical initiators can be employed with any monomer desired. When, for example, the half-life of the free radical initiator in toluene is more than 2 hours at the polymerization temperature, then a portion of the total amount or all of the free radical initiator can be mixed with the organohydrogenpolysiloxane and monomer containing aliphatic unsaturation. However, if the half-life of the free radical initiator in toluene is less than 2 hours at the polymerization temperature, then it is preferred that the free radical initiator be added in increments or continuously during the polymerization.

The organohydrogenpolysiloxanes may be polymerized with the monomers containing aliphatic unsaturation in the absence or presence of a liquid medium which is inert or nonreactive with the polymerization components, the polymerization products as well as in situ generated particulate matter. It is preferred that the liquid medium have a boiling point below about 130° C. at 760 mm Hg (abs.) and be a nonsolvent for polymers obtained as a result of the polymerization at the polymerization temperature. Examples of suitable inert liquids which may be employed are water, methanol and saturated aliphatic hydrocarbons, aliphatic fluoro and chloro hydrocarbons in which three halogen atoms are linked to at least one carbon atom. Water is the preferred inert liquid, since it is readily available and the organohydrogenpolysiloxane, monomer and the polymer obtained from the polymerization reaction are insoluble therein.

Also, it is possible to use a mixture consisting of several liquids having a boiling point below about 130° C. at 760 mm Hg (abs.) which are inert to the polymerization reactants and the polymer resulting therefrom at the polymerization temperature.

Although the temperature of the polymerization reaction is not critical, it has been found that temperatures above about 160° C. may in some cases prevent the generation of particulate matter, and thus provide a polymer having inferior properties. Consequently, it is preferred that the copolymerization be conducted at temperatures below about 150° C., and more preferably at a temperature of from about 50° C. to about 140° C.

It is preferred that the polymerization reaction be carried out in a substantially oxygen-free environment because of the free radical nature of the reaction. This can be accomplished by sweeping the reaction vessel with an inert gas such as nitrogen.

The polymerization reaction can be carried out at subatmospheric, atmospheric or superatmospheric pressure. Preferably the copolymerization reaction is carried out at atmospheric pressure. Depending on the particular conditions employed, the polymerization reaction is generally completed in from 30 minutes up to about 10 hours.

The proportion of organic monomers to organohydrogenpolysiloxanes may be varied within wide limits. Thus, the organohydrogenpolysiloxane concentration may range from about 20 to 95 percent based on the weight of the organic monomers and organohydrogenpolysiloxane. Even though the proportion of organohydrogenpolysiloxanes may be below about 20 percent by weight based on the weight of the reactants, it is preferred that the organohydrogenpolysiloxane concentration be from about 25 to 70 percent based on the total weight of the reactants.

It has been found that the shear rate may have a substantial influence on the formation of the particulate matter, especially the formation of elongated rodlike particles. It is believed that by controlling the amount of shear exerted on the reactants, particles are formed which take on different configurations. For example, elongated rodlike particles of from 10 to 500 microns in length and from 1 to 5 microns in diameter are generated in situ by carefully controlling the shear rate. Also, it has been found that these rodlike particles greatly improve the physical properties of the resultant organopolysiloxane composition, especially the cured polymers. Consequently, it is preferred that elongated rodlike particles be generated in order to impart improved physical properties to the resultant polymer. For example, where organopolysiloxane compositions containing rodlike structures are cured to form elastomeric materials, resultant elastomers exhibit improved tensile strength, elongation and tear strength values.

Since the shear rate may have a profound influence on the size and shape of in situ generated particles, it is preferred that the shear rate be in the range of from about 5 to 1,000 sec.$^{-1}$ and more preferably from about 15 to 300 reciprocal seconds. The shear rate is calculated as the linear speed of the impeller divided by its distance from the reactor wall at the point of its closest contact.

The products of this invention may be separated from the unreacted monomers by any conventional technique known in the art, such as by distillation, solvent extraction or selective solvent fractionation.

The modified organopolysiloxane compositions obtained from the polymerization reaction of the present invention include organohydrogenpolysiloxanes in which some or all of the organic polymer is grafted to the organopolysiloxane chain through a carbon-to-carbon linkage and mixtures of organic homopolymers, copolymers and organohydrogenpolysiloxanes.

The modified organopolysiloxane compositions of this invention are useful in the preparation of elastomers, sealants, potting compounds and as coatings. Also, these compositions are useful as molding compositions, especially where it is desired to keep shrinkage to a minimum.

These modified organopolysiloxane compositions may be used in the preparation of room temperature and heat vulcanizable elastomers. Generally these room temperature and heat vulcanizable compositions contain (1) the modified organohydrogenpolysiloxane composition whose preparation is described above, (2) a compound having at least two vinyl groups per molecule as a crosslinking agent and (3) a catalyst which promotes the addition of the SiH group of the organohydrogenpolysiloxane to the vinyl group of the vinylorganopolysiloxane.

Vinyl containing compounds which may be used as crosslinking agents in the present invention are vinyl containing organopolysiloxanes. These vinyl containing organopolysiloxanes are well known and have the average unit formula $$(R)_a(R')_b SiO_{4-a-b/2} \qquad \text{IV}$$

in which R is the same as above, R' is a vinyl group, i.e., $CH_2=CH-$, linked to the silicon atom by a silicon-carbon linkage, a has a value of from 0 to 2.5, preferably from 0.5 to 2.1, b has a value of from 0.0005 to 2.0, and the sum of a and b is equal to 1.0 to 3. Suitable vinylorganopolysiloxanes are disclosed for example in U.S. Pat. Nos. 3,159,662 and 3,220,972.

In Formula IV the R radicals which may be the same or different are monovalent hydrocarbon radicals having from 1 to 18 carbon atoms, halogenated hydrocarbon radicals and cyanoalkyl radicals. Preferably, each R radical in Formula IV is a methyl radical.

The vinylorganopolysiloxanes represented by Formula IV above have a viscosity of from about 10 to about 750,000 centipoise at 25° C. and more preferably from about 100 to 150,000 centipoise at 25° C.

It is to be understood that Formula IV is intended to include organopolysiloxanes which are vinyl terminated or contain the vinyl groups along the chain or which are vinyl terminated and also contain vinyl groups along the chain.

Preferred vinylorganopolysiloxanes within the scope of Formula IV are vinyl terminated diorganopolysiloxanes having the general formula

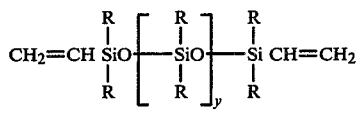

in which R is the same as above and y has a value sufficient to provide a viscosity of from about 10 to 750,000 centipoise at 25° C. Vinyl terminated diorganopolysiloxanes are well known as illustrated by U.S. Pat. No. 3,436,366.

Specific examples of vinylorganopolysiloxanes within the scope of Formula IV are vinylpentamethyldisiloxane, 1,3-divinyltetramethyldisilosane, 1,1,3-trimethyl-1,3,3-trivinyldisiloxane, 1,1,3,3-tetravinyldimethyldisiloxane as well as higher polymers containing up to 100,000 or more silicon atoms per molecule. Also included in Formula IV are cyclic siloxanes containing silicon bonded vinyl groups such as the cyclic trimer, tetramer or pentamer of methylvinyl siloxane [(CH$_2$=CH)(CH$_3$) SIO]. The preferred cyclic siloxane is the tetramethyltetravinylcyclotetrasiloxane.

The vinylorganopolysiloxanes represented by Formula IV may also be copolymers having (1) siloxane unit of the formula

where R and R' are the same as above, c has a value of 0, 1 or 3, d has a value of 1 or 2 and the sum of c and d is equal to 1, 2 or 3 and (2) an organopolysiloxane represented by Formula III above. Thus, when the vinylorganopolysiloxane employed herein is a copolymer having siloxane units within the scope of Formula V with units within the scope of Formula III, the copolymer generally contains from 1.0 to 99.5 mol percent of units within the scope of Formula V and from 0.5 to 99.9 mol percent of units within the scope of Formula III.

Also, included among the vinylorganopolysiloxanes are those polysiloxane compositions containing mixtures of organopolysiloxanes containing vinyl groups.

Other vinyl containing compounds which may be employed as crosslinking agents are organic compounds having at least two nonconjugated olefinic linkages. Examples of suitable compounds are esters, such as allyl methacrylate, allyl acrylate, diallyl adipate, methallyl acrylate, methallyl methacrylate, vinyl acrylate and vinyl methacrylate; esters, such as divinyl ether of diethylene glycol, hydrocarbons, such as divinylbenzene and vinylcyclohexene; polyol esters of acrylic acid and methacrylic acid, e.g., ethylene dimethacrylate, tetramethylene diacrylate, 1,3-butylene dimethacrylate, trimethylolpropane trimethacrylate and pentaerythritol tetramethacrylate.

The catalyst employed in the vulcanizable compositions of this invention may be any of the platinum compounds or platinum containing complexes which promote the addition of silicon bonded hydrogen atoms to silicon bonded vinyl groups. Examples of suitable platinum compounds are chloroplatinic acid, platinum deposited on carriers such as silica gel or powdered charcoal, salts of platinum, the reaction products of chloroplatinic acid and alcohols, aldehydes and ketones, platinum-siloxane complexes, platinum-olefin complexes, platinum carboxylates, nitrile-platinum halide complexes, ammonium platinum complexes such as disclosed in U.S. Pat. No. 3,795,656 to Martin and platinum complexes of unsaturated siloxanes which are substantially free of halogen, such as disclosed in U.S. Pat. No. 3,814,730 Karstedt. Preferably the platinum catalyst is a platinum-ketone complex such as disclosed in U.S. Pat. No. 3,798,252 to Nitzsche et al.

The proportions of the various ingredients employed in the practice of the present invention can vary within wide limits and the proportions of ingredients are not affected by the stoichiometry of the addition reactants involved, since many of the products prepared in accordance with this invention exhibit satisfactory properties even though the final product may contain unreacted vinyl groups or unreacted silicon-bonded hydrogen atoms. Generally, the vinyl containing compound and the organohydrogenpolysiloxane obtained from the polymerization reaction should be present in such proportions that the reaction mixture contains from 0.005 to 20 silicon-hydrogen linkages per vinyl group. Moreover, it is preferred that an equal number of silicon-hydrogen linkages and vinyl groups be present in the reaction mixture to form a final product which is free of silicon-hydrogen linkages and vinyl groups.

The platinum catalyst is generally added to the mixture containing the vinyl compound and the organohydrogenpolysiloxane obtained from the polymerization reaction in an amount based on the vinyl groups present in the composition. A satisfactory reaction will occur when the catalyst composition is present in an amount sufficient to provide as little as one atom of platinum per million vinyl groups present in the vinyl containing compound. The catalyst may be present in an amount to provide as high as one platinum atom per thousand vinyl groups. In general, it is preferred that the platinum catalyst be employed in an amount sufficient to provide from one platinum atom per 1,000 to one platinum atom per 100,000 vinyl groups in the vinyl containing compound.

When employing exceptionally small quantities of the platinum catalyst, it is often desirable to dissolve the latter in a solvent which is inert to the reactants under the conditions of the reaction so as to facilitate uniform dispersion or solution of the platinum catalyst in the vinyl containing compound and the organohydrogenpolysiloxane obtained from the polymerization reaction. Suitable solvents include, for example, hydrocarbon solvents such as benzene, toluene, xylene, mineral spirits, halogenated alkanes as well as oxygenated solvents such as dioxane, ethanol, butanol and the like. Where a diluent or solvent is employed, the amount of the latter is not critical. Satisfactory solutions of platinum catalysts can be prepared which contain from 0.1 to 0.0001 part of platinum catalyst per part of solvent.

The composition containing the vinyl compound and the organohydrogenpolysiloxane obtained from the polymerization reaction and platinum catalyst can be vulcanized at temperatures as low as room temperature up to temperatures of the order of 100° to 150° C. The time required for vulcanizing the composition can also vary over wide limits, depending upon the particular reactants involved, the proportions of reactants and the reaction temperature. Thus, curing can be effected in times which vary from a few minutes up to 24 hours or more. If all other factors are equal, the rate of reaction increases as the temperature increases and as the concentration of the platinum catalyst in the reaction mixture increases.

Where it is desired to store these curable compositions for a period of time, it is preferred that these compositions be prepared in two separate packages, which are later combined at a time when the compositions are to be cured, i.e., converted to an elastomeric state. In the case of a two package formulation, the organohydrogenpolysiloxane composition prepared in accordance with this invention and the platinum catalyst are placed in one package and the vinyl containing compound and any other fillers or additives are placed in the second package. These packages are merely mixed at the point of use and the mixture cured.

While the curable compositions of the present invention are sufficiently reinforced by the presence of the in situ generated particulate matter, additional fillers and other additives may be incorporated therein. Examples of suitable fillers which may be employed in the curable compositions are fumed silicas, high-surface-area precipitated silicas, silica aerogels as well as coarser silicas such as diatomaceous earth, crushed quartz and the like. Other fillers which may be used are metallic oxides such as titanium oxide, ferric oxide, zinc oxide and fibrous fillers such as asbestos, fibrous glass and the like. Additives such as pigments and antioxidants and ultraviolet absorbents and the like may also be included in these compositions.

Various embodiments of this invention are further illustrated by the following examples in which all parts are by weight unless otherwise specified.

PREPARATION OF MODIFIED ORGANOHYDROGENPOLYSILOXANE COMPOSITIONS

Example 1

A mixture containing 78 parts of stryene, 63 parts of butyl acrylate, 94 parts of a hydrogen terminated dimethylpolysiloxane having a viscosity of 50 centipoise at 25° C. and an SiH content of 0.7 percent, 1.5 parts of 1,1-di-t-butylperoxy-3,3,5-trimethylcyclohexane and 12 parts of water are added to a 500 milliliter glass reactor equipped with a stirrer, nitrogen inlet, reflux condenser and oil bath. The system is flushed with nitrogen and heated to a temperature of about 97° C. with agitation for about 4.3 hours and then stripped for one hour at 100° C. and for an additional hour at 120° C. The viscosity of the resultant product is determined with a Brookfield Viscometer at 25° C. with a No. 7 spindle and at 10 revolutions per minute. After one minute the viscosity is 92,000 centipoise, after five minutes, 68,000 centipoise and after ten minutes 60,000 centipoise. The resultant product, which is a while opaque viscous material contains elongated particulate matter when viewed under a microscope (X430).

Example 2

A mixture containing 141 parts of styrene, 94 parts of a hydrogen terminated dimethylpolysiloxane having a viscosity of 50 centipoise at 25° C. and an SiH content of 0.7 percent and 1.5 parts of 1,1-di-t-butylperoxy-3,3,5-trimethylcyclohexane are added to a 500 milliliter glass reactor equipped with a stirrer, nitrogen inlet, reflux condenser and oil bath. The system is flushed with nitrogen and heated to a temperature of about 97° C. with agitation for about 4.3 hours and then stripped for one hour at 100° C. and for an additional hour at 120° C.

Example 3

A mixture containing 41 parts of styrene, 204 parts of butylacrylate, 164 parts of a hydrogen terminated dimethylpolysiloxane having a viscosity of 50 centipoise and an SiH content of 0.7 percent, 1.5 parts of 1,1-di-t-butylperoxy-3,3,5-trimethylcyclohexane and 20 parts of water are added to an 800 milliliter glass reactor equipped with a stirrer, nitrogen inlet, reflux condenser and oil bath. The system is flushed with nitrogen and heated to a temperature of 97° C. with agitation for about 4.3 hours and then stripped for one hour at 100° C. and for an additional hour at 120° C.

Example 4

A mixture containing 154 parts of butylacrylate, 42 parts of acrylonitrile, 131 parts of hydrogen terminated dimethylpolysiloxane having a viscosity of 50 centipoise at 25° C. and an SiH content of 0.7 percent, 1.5 parts of 1,1-di-t-butylperoxy-3,3,5-trimethylcyclohexane and 15 parts of water are added to a 500 milliliter glass reactor equipped with a stirrer, nitrogen inlet, reflux condenser and oil bath. The system is flushed with nitrogen and heated to a temperature of about 97° C. with agitation for about 4.3 hours and then stripped for one hour at 100° C. and for an additional hour at 120° C.

Example 5

A mixture containing 90 parts of vinylchloride, 210 parts of a trimethylsiloxy-terminated copolymer having a viscosity of 400 centipoise at 25° C. and consisting of 2 mol percent methylhydrogensiloxane units with the remainder of the diorganopolysiloxane units being dimethylsiloxane units and 1.5 parts of 1,1-di-t-butylperoxy-3,3,5-trimethylcyclohexane are added to a 500 milliliter glass reactor equipped with a stirrer, nitrogen inlet, reflux condenser and oil bath. The system is flushed with nitrogen and heated to a temperature of about 97° C. with agitation for about 4.3 hours, and then stripped for one hour at 100° C. and for an additional hour at 120° C.

Example 6

A mixture containing 155 parts of vinyl acetate, 145 parts of a copolymer having a viscosity of 1,000 centipoise at 25° C. consisting of dimethylhydrogensiloxane, dimethylsiloxane, methylhydrogensiloxane and trimethylsiloxane units in a mol ratio of 1.9, 4.9, 3.1 and 0.1 respectively, 1 part of tert-butylperoctoate and 12 parts of water are added to a 500 milliliter glass reactor equipped with a stirrer, nitrogen inlet, reflux condenser and oil bath. The system is flushed with nitrogen and heated to a temperature of about 97° C. with agitation for about 4.3 hours, and then stripped for one hour at 100° C. and for an additional hour at 120° C. A white viscous opague fluid is obtained.

Example 7

A mixture containing 150 parts of vinylidene chloride, 150 parts of the polysiloxane fluid of Example 1, 1 part di-t-butylperoxide and 12 parts of water are added to a 500 milliliter glass reactor equipped with a stirrer, nitrogen inlet, reflux condenser and oil bath. The system is flushed with nitrogen and heated to a temperature of about 97° C. with agitation for about 4.3 hours, and then stripped for one hour at 100° C. and for an additional hour at 120° C. A white viscous opaque fluid is obtained.

Example 8

A mixture containing 100 parts of styrene, 82 parts of butyl acrylate, 10 parts of allyl methacrylate, 121 parts of the polysiloxane fluid of Example 1, 1 part of di-t-butylperoxide and 12 parts of water are added to a 500 milliliter glass reactor equipped with a stirrer, nitrogen inlet, reflux condenser and oil bath. The system is flushed with nitrogen and heated to a temperature of about 97° C. with agitation for about 4.3 hours, and then stripped for one hour at 100° C. and for an additional hour at 120° C. A white viscous opaque product is obtained.

Example 9

The procedure of Example 1 is repeated except that 94 parts of a hydrogen terminated dimethylpolysiloxane having a viscosity of 350 centipose at 25° C. are substituted for the polysiloxane of Example 1. A white viscous composition is obtained.

Example 10

The procedure of Example 8 is repeated except that 150 parts of a hydrogen terminated dimethylpolysiloxane having a viscosity of 400 centipoise at 25° C. are substituted for the polysiloxane fluid of Example 8.

Example 11

The procedure of Example 1 is repeated except that 100 parts of a copolymer containing dimethylsiloxane, methylhydrogensiloxane and trimethylsiloxane units having a ratio of dimethylsiloxane units to methylhydrogensiloxane units of 12:1 and a viscosity of 3,000 centipoise at 25° C. are substituted for the methylhydrogenpolysiloxane of Example 1.

PREPARATION OF VULCANIZED COMPOSITIONS

Example 12

A mixture containing 20 parts of the modified organopolysiloxane composition of Example 1, 0.5 part of a 0.01 percent by weight solution of chloroplatinic acid in isopropanol and 0.5 part of 1,3,5,7-tetramethyl-1,3,5,7-tetravinylcyclotetrasiloxane cures to an elastomeric solid overnight.

Example 13

A mixture containing 20 parts of the modified organopolysiloxane composition of Example 1, 0.5 part of a 0.01 percent by weight solution of chloroplatinic acid in isopropanol and 0.5 part of 1,3,5,7-tetramethyl- 1,3,5,7-tetravinylcyclotetrasiloxane is heated to 120° C. and cures to an elastomeric solid in less than one hour.

Example 14

A mixture containing 10 parts of the modified organopolysiloxane composition of Example 1, 0.75 part of 1,3,5,7-tetramethyl-1,3,5,7-tetravinylcyclotetrasiloxane and 0.25 part of an amino-functional platinum catalyst prepared in accordance with Example 1 of U.S. Pat. No. 3,795,656 is heated to 115° C. and cures to an elastomeric solid in 8 minutes.

Example 15

The procedure of Example 14 is repeated except that 10 parts of the modified organopolysiloxane of Example 3 is substituted for the modified organopolysiloxane composition of Example 1. The composition cures to an elastomeric solid when heated to 115° C.

Example 16

The procedure of Example 14 is repeated except that the composition of Example 4 is substituted for the modified composition of Example 1. An elastomer is obtained after heating to 115° C. for about 10 minutes.

Example 17

The procedure of Example 14 is repeated except that a copolymer having a viscosity of 2,000 centipoise at 25° C. and containing 95 mol percent of dimethylsiloxane units and 5 mol percent of methylvinylsiloxane units is mixed with the modified organopolysiloxane of Example 8 and cured at 115° C. to form an elastomeric solid.

Although specific examples of the invention have been described herein, it is not intended to limit the invention solely thereto, but to include all the variations and modifications falling within the spirit and scope of the appended claims.

What is claimed is:

1. A vulcanizable composition containing (A) a modified organopolysiloxane composition which is obtained from the polymerization of (1) a monomer having ethylenic unsaturation in the presence of (2) an organohydrogenpolysiloxane fluid having a viscosity of from 10 to 1,000,000 centipoise at 25° C., in which the organohydrogenpolysiloxane fluid is present in an amount of from 20 to 95 percent by weight based on the weight of monomer (1) and organohydrogenpolysiloxane (2) and (3) a free radical initiator to form a composition having in-situ generated particulate matter dispersed therein and having a polymeric organic group which is constituted of recurring units derived from monomer (1) grafted to the organohydrogenpolysiloxane fluid (2), said in-situ generated particulate matter resulting from the polymerization of monomer (1) in the presence of organohydrogenpolysiloxane (2) and free radical initiator (3), (b) a vinyl containing compound having at least two vinyl groups per molecule which is capable of crosslinking with (A) and (C) a catalyst capable of promoting the addition of silicon-bonded hydrogen groups to silicon-bonded vinyl groups.

2. The composition of claim 1, wherein the organohydrogenpolysiloxane fluid is present in an amount of from 25 to 70 percent by weight based on the weight of monomer (1) and organohydrogenpolysiloxane (2).

3. The composition of claim 1, wherein the organohydrogenpolysiloxane fluid is a hydrogen terminated diorganosiloxane.

4. The composition of claim 1, wherein the organohydrogenpolysiloxane fluid is represented by the formula $$(R)_a Si(H)_b SiO_{4-a-b/2}$$

where R is an organic radical free of aliphatic unsaturation and is selected from the group consisting of monovalent hydrocarbon radicals, halogenated hydrocarbon radicals and cyanoalkyl radicals, a has a value of from 0 to 2.5, b has a value of from 0.0005 to 2.0 and the sum of a and b is equal to 1.0 to 3.

5. The composition of claim 1, wherein the organohydrogenpolysiloxane fluid is a copolymer having at least one unit of the formula $$(R)_c(H)_d SiO_{4-c-d/2}$$

and the remaining siloxane units having the formula $$(R)_n SiO_{4-n/2}$$

where R is an organic radical free of aliphatic unsaturation and is selected from the group consisting of monovalent hydrocarbon radicals, halogenated hydrocarbon radicals and cyanoalkyl radicals, c has a value of 0, 1 or 2, d has a value of 1 or 2 and the sum of c and d is equal to 1, 2 or 3 and n has a value of 0, 1, 2 or 3.

6. The composition of claim 1, wherein the organohydrogenpolysiloxane fluid has the formula

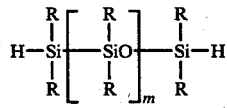

where R is an organic radical free of aliphatic unsaturation and is selected from the class consisting of monovalent hydrocarbon radicals, halogenated monovalent hydrocarbon radicals and cyanoalkyl radicals and m has a value sufficient to provide a viscosity of from 10 to 1,000,000 centipoise at 25° C.

7. The composition of claim 1, wherein the polymeric organic group is constituted of recurring units derived from at least two monomers having ethylenic unsaturation.

8. The composition of claim 7, wherein at least one of the monomers is a non-conjugated polyolefinic monomer.

9. The composition of claim 1, wherein the composition contains an inorganic filler.

10. The cured composition of claim 1.

11. The composition of claim 1, wherein the vinyl containing compound is a vinylorganopolysiloxane.

12. The composition of claim 11, wherein the vinylorganopolysiloxane is represented by the formula $$(R)_a(R')_b SiO_{4-a-b/2}$$

where R is an organic radical free of aliphatic unsaturation and is selected from the group consisting of monovalent hydrocarbon radicals, halogenated monovalent hydrocarbon radicals and cyanoalkyl radicals, R' is a vinyl group, a has a value of from 0 to 2.5, b has a value of from 0.0005 to 2.0 and the sum of a and b is from 1.0 to 3.

13. The composition of claim 11, wherein the vinylorganopolysiloxane is a copolymer having at least one siloxane unit of the formula $$(R)_c(R')_d SiO_{4-c-d/2}$$

and the remaining siloxane units have the formula $$(R)_n SiO_{4-n/2}$$

where R is an organic radical free of aliphatic unsaturation and is selected from the group consisting of monovalent hydrocarbon radicals, halogenated hydrocarbon radicals and cyanoalkyl radicals, R' is a vinyl radical, c has a value of 0, 1 or 2, d has a value of 1 or 2 and the sum of c and d is equal to 1, 2 or 3 and n has a value of 0, 1, 2 or 3.

14. The composition of claim 11, wherein the vinylorganopolysiloxane is represented by the formula

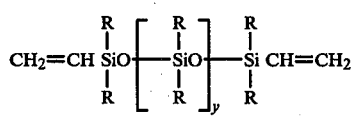

where R is an organic radical free of aliphatic unsaturation and is selected from the group consisting of monovalent hydrocarbon radicals, halogenated monovalent hydrocarbon radicals and cyanoalkyl radicals and y has a value sufficient to provide a viscosity of from 10 to 750,000 centipoise at 25° C.

15. The composition of claim 14, wherein R is an alkyl radical.

16. The composition of claim 15 where R is a methyl radical.

17. A process for preparing a vulcanizable modified organopolysiloxane composition which comprises (A) preparing a modified organopolysiloxane composition by polymerizing (1) a monomer having ethylenic unsaturation in the presence of (2) an organohydrogenpolysiloxane fluid having a viscosity of from 10 to 1,000,000 centipoise at 25° C. in which the organohydropolysiloxane is present in an amount of from 20 to 95 percent by weight based on the weight of the monomer (1) and organohydrogenpolysiloxane (2) and (3) a free radical initiator to form a modified organopolysiloxane composition having in-situ generated particulate matter dispersed therein and having a polymeric organic group which is constituted of recurring units derived from the monomer (1) grafted to the organohydrogenpolysiloxane fluid, said in-situ generated particulate matter resulting from the polymerization of monomer (1) in the presence of organohydrogenpolysiloxane (2) and free radical initiator (3), and thereafter (B) adding a vinyl containing compound having at least two vinyl groups per molecule which is capable of crosslinking with (A) and (C) a catalyst capable of promoting the addition of silicon-bonded hydrogen groups to silicon-bonded vinyl groups.

18. The process of claim 17, wherein the polymerization is conducted at a temperature of from 50° to 160° C.

19. The process of claim 17, wherein the polymerization is conducted in the presence of a liquid medium which is inert with the polymerization components and the polymerization products at the polymerization temperature.

20. The process of claim 17, wherein the polymerization is conducted in the presence of an organic peroxide.

* * * * *